US008964612B2

(12) United States Patent
Moritomo

(10) Patent No.: US 8,964,612 B2
(45) Date of Patent: Feb. 24, 2015

(54) COMMUNICATION APPARATUS BELONGING TO A PLURALITY OF NETWORKS, METHOD FOR CONTROLLING THE SAME, TO REDUCE POWERON CONSUMPTION

(75) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 12/959,158

(22) Filed: Dec. 2, 2010

(65) Prior Publication Data

US 2011/0134819 A1 Jun. 9, 2011

(30) Foreign Application Priority Data

Dec. 7, 2009 (JP) ................................. 2009-278005

(51) Int. Cl.
*G08C 17/00* (2006.01)
*H04W 52/02* (2009.01)
*H04W 76/04* (2009.01)

(52) U.S. Cl.
CPC ...... *H04W 52/0203* (2013.01); *H04W 52/0235* (2013.01); *H04W 76/048* (2013.01); *Y02B 60/50* (2013.01)
USPC ........... 370/311; 370/318; 455/450; 455/561; 455/574

(58) Field of Classification Search
USPC ....................................................... 370/311
See application file for complete search history.

(56) References Cited

U.S. PATENT DOCUMENTS

| | | | |
|---|---|---|---|
| 7,362,722 B2 | 4/2008 | Otsuka | |
| 7,573,842 B2 * | 8/2009 | Xie et al. ...................... | 370/311 |
| 7,809,328 B2 * | 10/2010 | Nishimura .................... | 455/11.1 |
| 7,873,848 B2 * | 1/2011 | Nakahara et al. .............. | 713/320 |
| 8,214,893 B2 * | 7/2012 | Quigley et al. .................. | 726/21 |
| 2006/0079232 A1 * | 4/2006 | Omori et al. .................... | 455/436 |
| 2006/0133295 A1 * | 6/2006 | Sakai et al. ..................... | 370/252 |
| 2006/0215601 A1 * | 9/2006 | Vleugels et al. ............... | 370/328 |
| 2006/0285528 A1 * | 12/2006 | Gao et al. ....................... | 370/338 |
| 2007/0230386 A1 * | 10/2007 | Beach ............................ | 370/311 |
| 2007/0297347 A1 | 12/2007 | Ikeda | |

(Continued)

FOREIGN PATENT DOCUMENTS

JP 2002-158609 A 5/2002
JP 2005086350 A 3/2005

(Continued)

OTHER PUBLICATIONS

Office Action issued on Dec. 17, 2013, in counterpart Japanese Application No. 2009-278005.

*Primary Examiner* — Brian Roberts
*Assistant Examiner* — Shah R Zaman
(74) *Attorney, Agent, or Firm* — Carter, DeLuca, Farrell & Schmidt, LLP

(57) ABSTRACT

A communication apparatus includes a participation unit, a formation unit, a management unit, and a notification unit. The participation unit participates in a first network formed by a first base station. The formation unit forms a second network as a second base station. The management unit manages a power mode of another communication apparatus participating in the second network. Moreover, when the participation unit participates in the first network and the formation unit forms the second network, the notification unit notifies the first base station of a change of a power mode of the communication apparatus according to the power mode managed by the management unit.

11 Claims, 9 Drawing Sheets

(56) References Cited

U.S. PATENT DOCUMENTS

| | | | |
|---|---|---|---|
| 2008/0192698 A1* | 8/2008 | Rue | 370/331 |
| 2008/0232270 A1* | 9/2008 | Fleming et al. | 370/254 |
| 2009/0109888 A1* | 4/2009 | Xie et al. | 370/311 |
| 2009/0196200 A1* | 8/2009 | Moritomo | 370/254 |
| 2010/0281308 A1* | 11/2010 | Xu et al. | 714/45 |

FOREIGN PATENT DOCUMENTS

| | | |
|---|---|---|
| JP | 2007-036423 A | 2/2007 |
| JP | 2008005316 A | 1/2008 |
| WO | 2008/149598 A1 | 12/2008 |

* cited by examiner

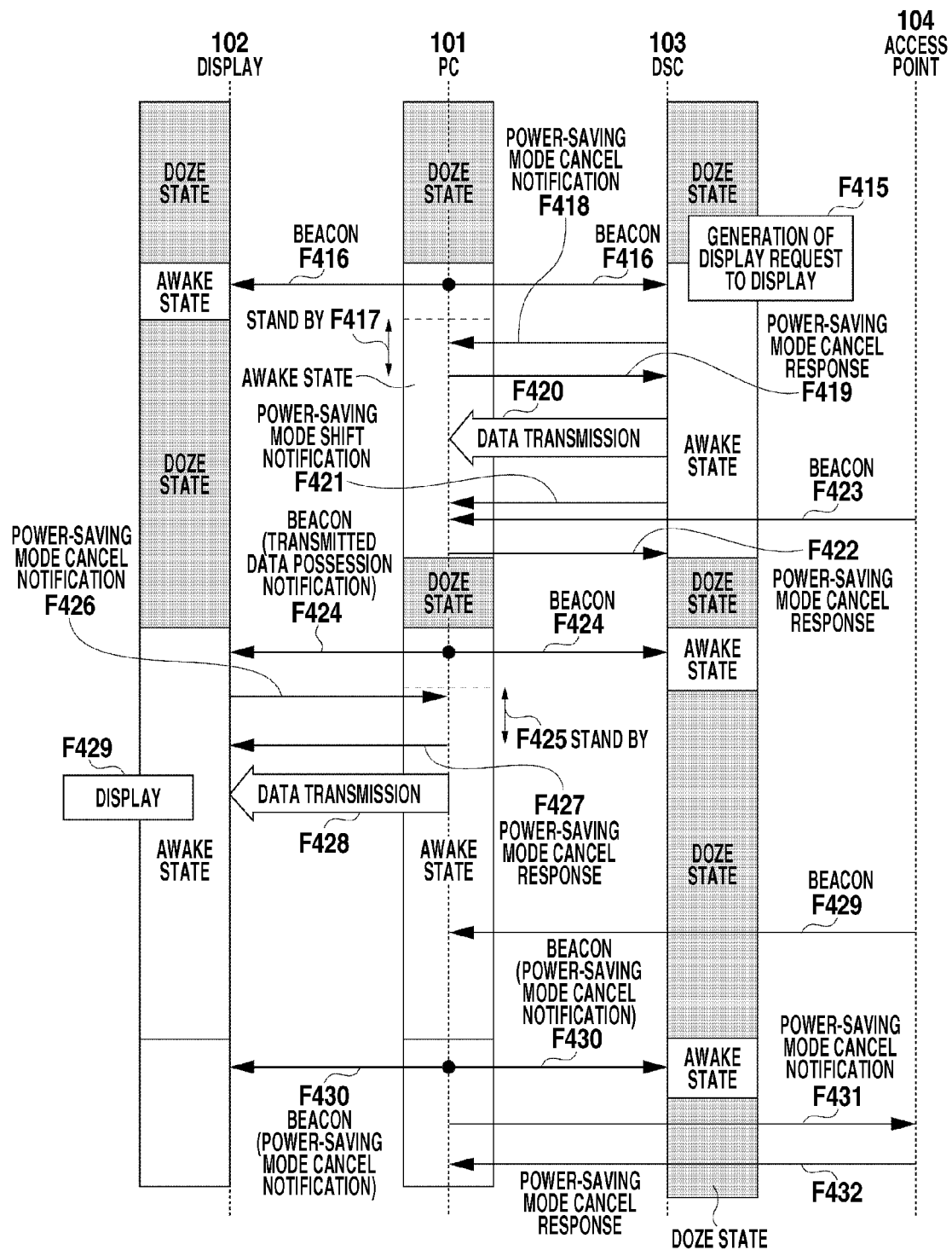

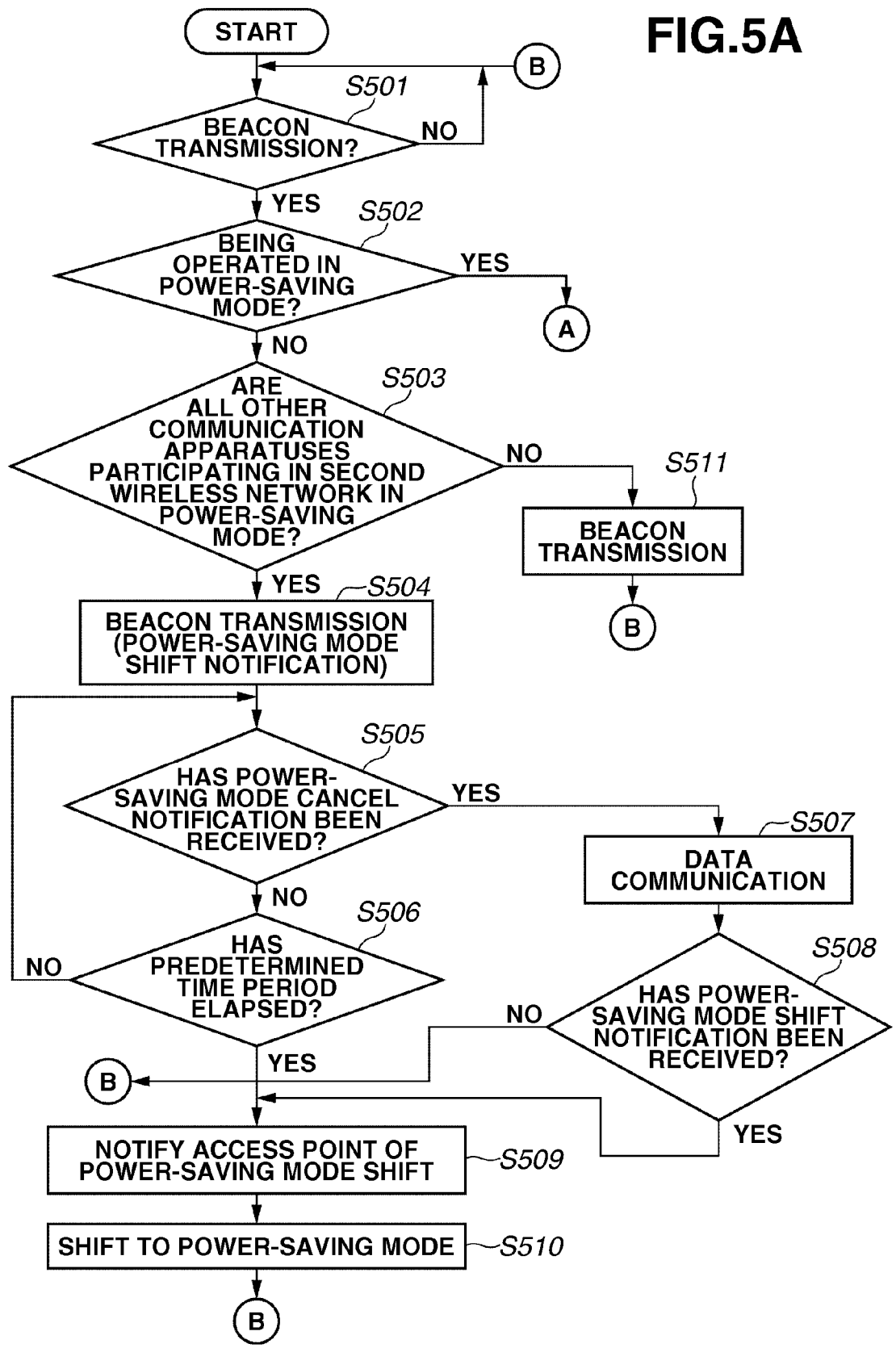

COMMUNICATION APPARATUS BELONGING TO A PLURALITY OF NETWORKS, METHOD FOR CONTROLLING THE SAME, TO REDUCE POWER ON CONSUMPTION

BACKGROUND OF THE INVENTION

1. Field of the Invention

The present invention relates to a method for reducing power consumption in a communication apparatus that belongs to a plurality of networks.

2. Description of the Related Art

Recently, a wireless local area network (hereinafter, wireless LAN) system compliant with Institute of Electrical and Electronics Engineers (IEEE) 802.11 has come into wide use. Network modes of the wireless LAN includes an infrastructure mode where stations (terminal stations) communicate with each other via an access point (base station), and an ad hoc mode where the stations directly communicate with each other.

Recently, a communication apparatus has been put into the market, which has both of an access point function for performing communication as an access point and a station function for performing communication as the station by being connected to the access point. Such a communication apparatus can form a wireless network by becoming an access point itself according to the situation. The communication apparatus can also participate, as a station, in a wireless network formed by another access point.

U.S. Patent Application Publication No. 2007/0297347 (Japanese Patent Application Laid-Open No. 2008-005316) discusses an example of performing wireless communication with another communication apparatus by using one of the access point function and the station function. U.S. Pat. No. 7,362,722 (Japanese Patent Application Laid-Open No. 2005-086350) discusses an apparatus that participates in a first wireless network formed by an access point as a station, and forms a second wireless communication as an access point itself to perform communication.

In the wireless LAN, to reduce power consumption, the station can operate in a power-saving mode for stopping power supplying to a wireless communication unit for a predetermined period. On the other hand, the access point cannot operate in the power-saving mode because the access point has to perform participation or breakaway of stations in or from the wireless network formed by itself and relay communication between the stations.

However, power consumed by the communication apparatus that simultaneously operates both station and access point functions, as discussed in U.S. Pat. No. 7,362,722, is expected to be large. Especially, when the communication apparatus is a batter-activated device, it is desirable to reduce power consumption more.

However, the shift of such a communication apparatus to the power-saving mode as in the case of a usual wireless LAN station may disable data communication between apparatuses in the second wireless network formed by the communication apparatus itself.

SUMMARY OF THE INVENTION

An embodiment is directed to reduction of power consumption while suppressing data communication failures in first and second networks in a communication apparatus that participates in the first network formed by a first base station and forms the second network as a second base station.

According to an embodiment, a communication apparatus includes a participation unit, a formation unit, a management unit, and a notification unit. The participation unit participates in a first network formed by a first base station. The formation unit forms a second network as a second base station. The management unit manages a power mode of another communication apparatus participating in the second network. Moreover, when the participation unit participates in the first network and the formation unit forms the second network, the notification unit notifies the first base station of a change of a power mode of the communication apparatus according to the power mode managed by the management unit.

Further features of the present invention will become apparent from the following description of exemplary embodiments (with reference to the attached drawings).

BRIEF DESCRIPTION OF THE DRAWINGS

FIGS. 4A and 4B are sequence diagrams according to the first exemplary embodiment.

FIGS. 5A and 5B are flowcharts illustrating operations during beacon transmission of the PC according to the first exemplary embodiment.

DESCRIPTION OF THE EMBODIMENTS

Next, exemplary embodiments will be described with reference to the accompanying drawings. IEEE 802.11 is a set of standards carrying out wireless local area network (WLAN) computer communication in the 2.4, 3.6 and 5 GHz frequency bands. An example using a wireless LAN system compliant with IEEE 802.11 Standard will be described. However, a communication mode is not limited to this.

Figure 1:
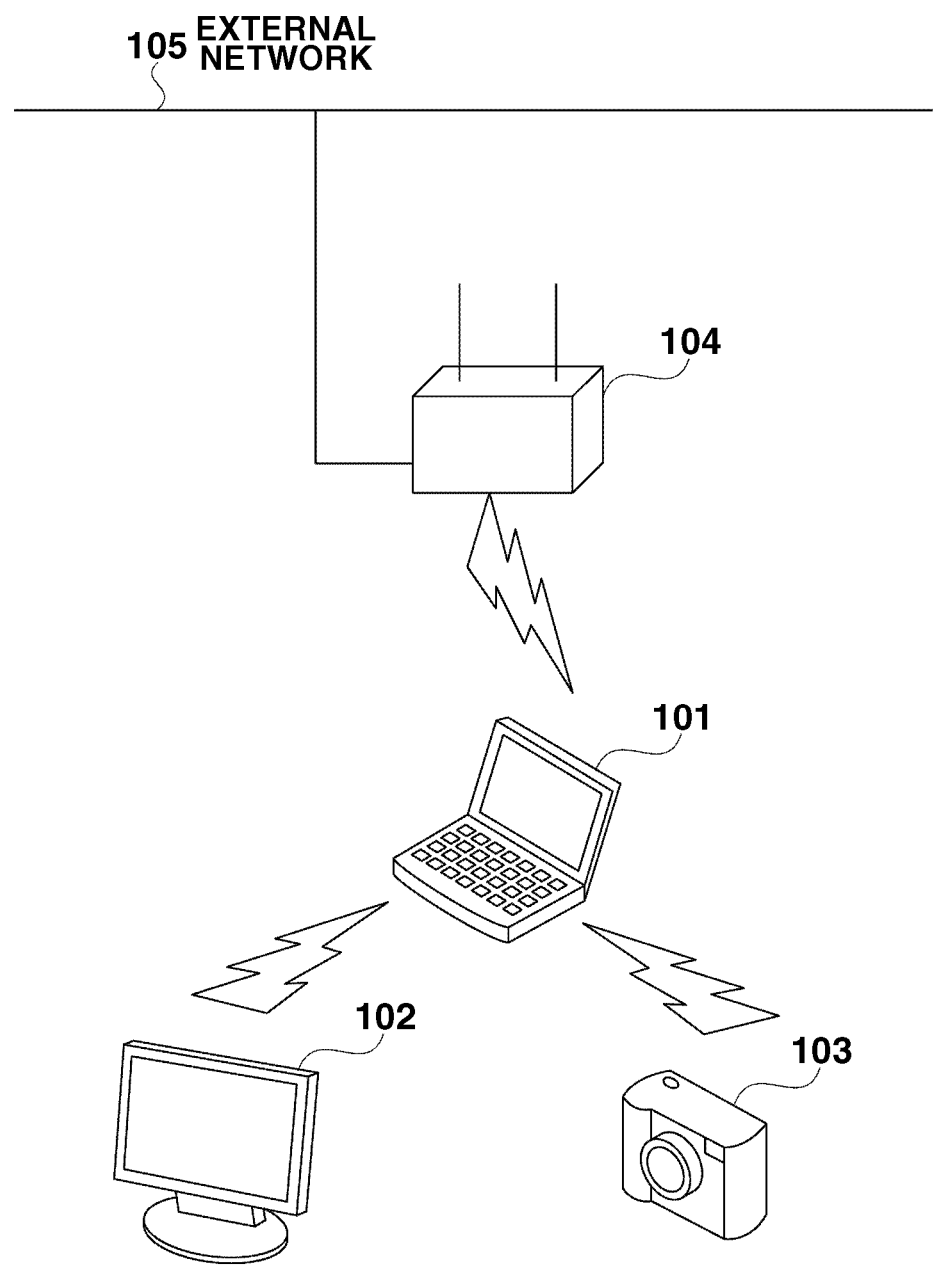
FIG. 1 illustrates a configuration common to systems according to first and second exemplary embodiments.

FIG. 1 illustrates a configuration example of a wireless LAN system compliant with the IEEE 802.11 Standard according to a first exemplary embodiment.

A personal computer (PC) 101 can perform wireless communication by using both access point (base station) and station (terminal station) functions. A display 102 and a digital still camera (hereinafter, DSC) 103 operate as stations. An access point 104 is connected to an external network 105.

The PC 101 participates in a first wireless network formed by the access point 104 as a station, and forms a second wireless network as an access point. The PC 101 can communicate with an external apparatus (not illustrated) present in the external network 105 via the access point 104, and performs wireless communication with another station (not illustrated) present in the first wireless network. The PC 101 can directly communicate with the display 102 and the DSC 103 that participate in the second wireless network, and can relay communication between the display 102 and the DSC 103.

Figure 2:
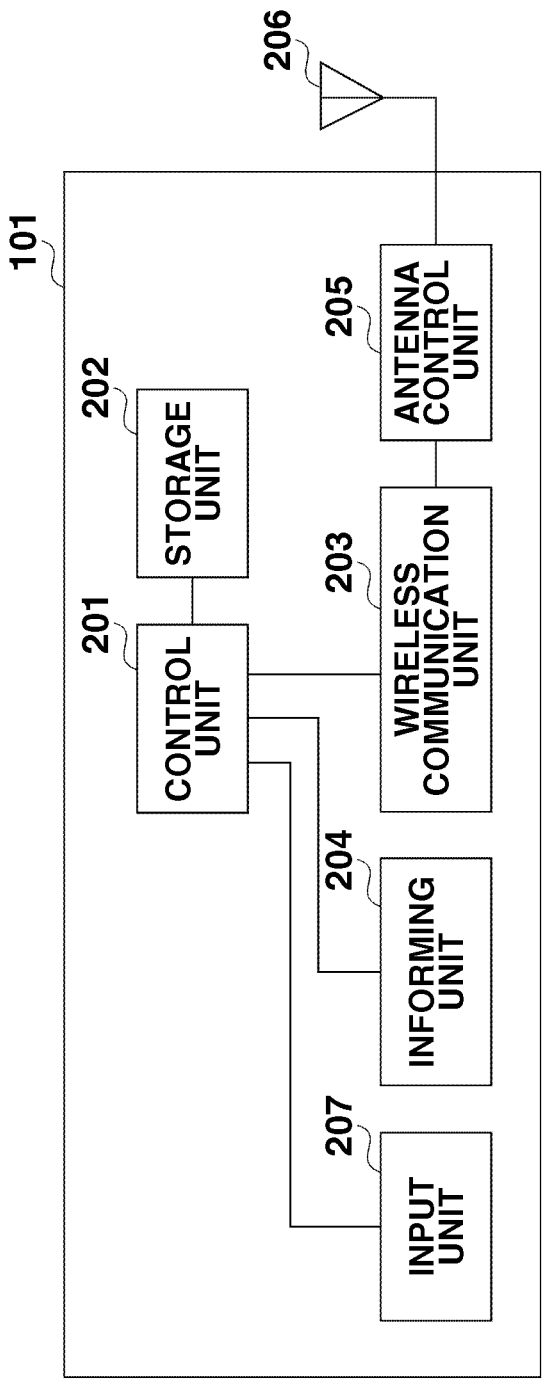
FIG. 2 is a block diagram illustrating a hardware configuration of a personal computer (PC) according to the first exemplary embodiment.

FIG. 2 is a block diagram illustrating an example of a hardware configuration of the PC 101.

A control unit 201 controls the entire apparatus by executing a control program stored in a storage unit 202. The storage unit 202 stores the control program executable by the control unit 201. Various operations described below are performed as a result of executing the control program stored in the storage unit 202 by the control unit 201. The storage unit 202 also stores communication parameters (network identification information, encryption scheme, authentication scheme, encryption key, and authentication key) for performing wireless communication in the first and second wireless networks.

A wireless communication unit 203 is configured to perform wireless communication. An informing unit 204 informs a user about various pieces of information, and has a function for displaying visually recognizable information as in the form of a liquid crystal display (LED) or a light emitting diode (LED), or outputting audio as in the form of a speaker.

The PC 101 further includes an antenna control unit 205, an antenna 206, and an input unit 207 that enables the user to input various pieces of data.

Figure 3:
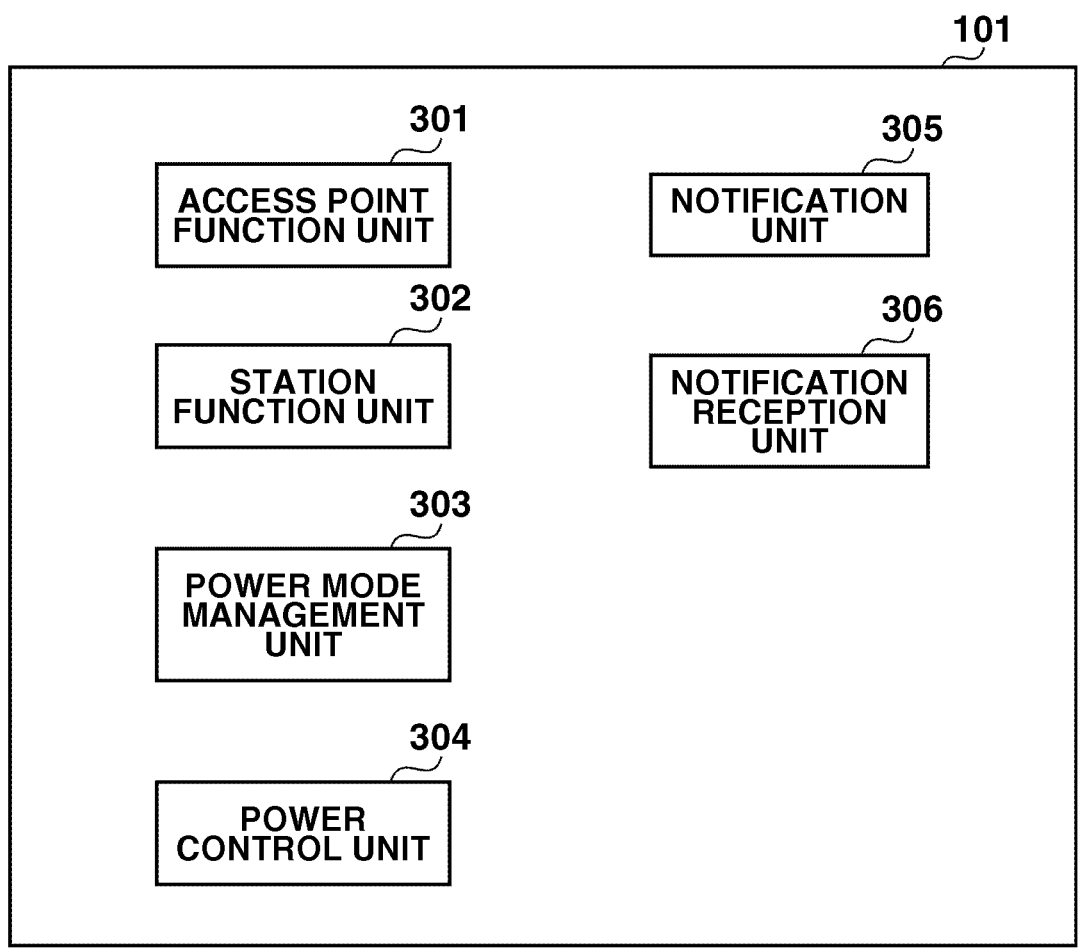
FIG. 3 is a block diagram illustrating a software function of the PC according to the first exemplary embodiment.

FIG. 3 is a block diagram illustrating an example of a software functional block configuration of the PC 101. A central processing unit may be configured to control at least one unit utilized in a method or apparatus described herein. Moreover, each apparatus, including the PC 101, may be implemented within, include, or otherwise be connected to the central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs.

An access point function unit 301 performs various processes so that the PC 101 can function as an access point. The access point function unit 301 forms a second wireless network as an access point, and manages transmission timing of a beacon (informing signal). The access point function unit 301 manages other communication apparatuses participating in the second wireless network, and relays data communication between the other communication apparatuses.

A station function unit 302 performs various processes so that the PC 101 can function as a station. The station function unit 302 performs processing to participate in the first wireless network formed by the access point 104. The station function unit 302 also receives a beacon transmitted from the access point 104 to synchronize with the first wireless network.

A power mode management unit 303 manages power modes of the other communication apparatuses (display 102 and DSC 103) participating in the second wireless network. The power mode management unit 303 manages which of a power-saving mode and a normal power mode (nonpower-saving mode) each apparatus participating in the second wireless network is operating in.

The power-saving mode is a power mode where switching is repeated between an awake state for supplying power to the entire wireless communication unit 203 and a doze state for stopping power supplying to at least a part of the wireless communication unit 203. The normal power mode (non-power-saving mode) is a power mode where the apparatus always operates in the awake state. When the station of the wireless LAN system compliant with the IEEE 802.11 Standard operates in the power-saving mode, the station usually shifts to the awake state at beacon reception timing to receive a beacon. At other time periods, the station operates in the doze state. As described below, the display 102 and the DSC 103 in the present exemplary embodiment operate in the awake state at a predetermined time period other than the beacon reception timing from the PC 101.

A power control unit 304 controls power supplying to the wireless communication unit 203. The power control unit 304 controls a shift of the PC 101 to the power-saving mode and a return to the normal operation mode, and controls switching between the awake state and the doze state when the PC 101 operates in the power-saving mode. As described below, when the PC 101 operates in the power-saving mode, the PC 101 operates in the awake state at a predetermined time period other than the beacon reception timing from the access point 104. The power control unit 304 determines whether to change a power mode according to power modes of the other communication apparatuses managed by the power mode management unit 303.

A notification unit 305 notifies the access point 104, the display 102, and the DSC 103 of a shift of a power mode of the PC 101 (shift to power-saving mode or cancel of power-saving mode).

A notification reception unit 306 receives a power-mode change notification from the display 102 or the DSC 103. The power mode management unit 303 manages, based on information received by the notification reception unit 306, which of the power-saving mode and the normal power mode the DSC 103 or the display 102 is operating in.

All of the functional blocks are mutually related by software or hardware. The functional blocks are only examples. A plurality of functional blocks can constitute one functional block, or one of the functional blocks can be divided into blocks of a plurality of functions.

Figure 4A:
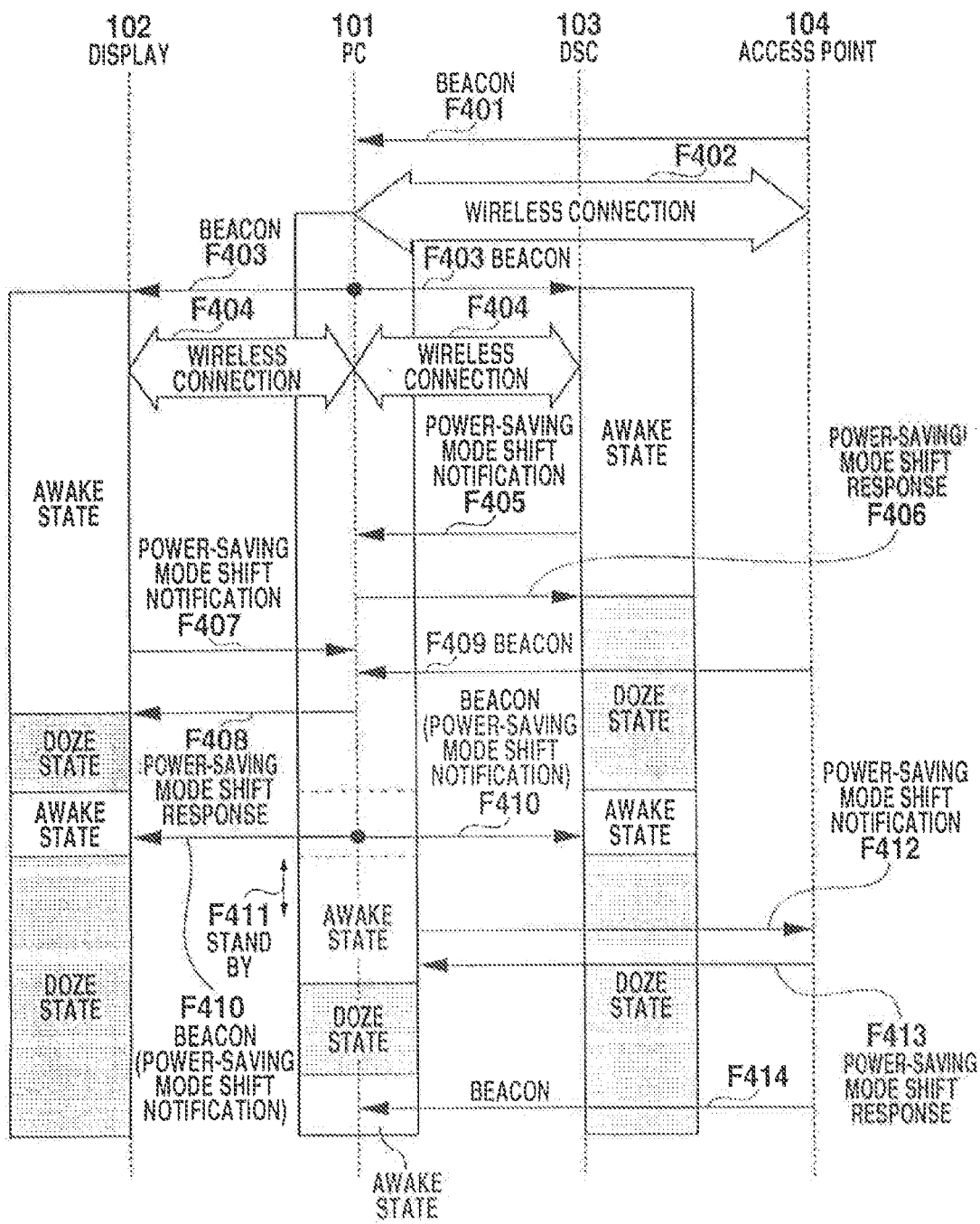

FIGS. 4A and 4B illustrate sequences of processing between the communication apparatuses according to the present exemplary embodiment. FIGS. 4A and 4B also illustrate respective power states (awake state and doze state) of the wireless communication units of the PC 101, the display 102, and the DSC 103.

In steps F401, F409, F414, F423, and F429, the access point 104 forms a first wireless network and periodically broadcast beacons that are synchronous signals on the first wireless network. In step F402, the PC 101 connects to the access point 104 by wireless based on information contained in the beacon (F401) to participate in the first wireless network as a station.

In step F403, the PC 101 forms a second wireless network as an access point and starts broadcasting beacons on the second wireless network. In step F404, the display 102 and the DSC 103 connect to the PC 101 by wireless based on information contained in the beacon (F403) to participate in the second wireless network.

The DSC 103 then shifts to the power-saving mode. A trigger for shifting to the power-saving mode is when no data has been transmitted/received for a predetermined period or when a battery capacity drops below a predetermined value. In step F405, the DSC 103 transmits a power-saving mode shift notification to the PC 101, which is an access point in the second wireless network. When a response to the notification is returned from the PC 101 in step F406, the DSC 103 shifts to the power-saving mode and changes from the awake state to the doze state.

Similarly, in step F407, to shift to the power-saving mode, the display 102 transmits a power-saving mode shift notification to the PC 101. When a response to the notification is returned from the PC 101 in step F408, the display 102 shifts to the power-saving mode and changes from the awake state to the doze state.

By receiving the power-saving mode shift notifications in steps F405 and F407, the PC 101 recognizes that all of the communication apparatuses participating in the second wireless network are operating in the power-saving mode. In step F410, to shift to the power-saving mode itself, the PC 101 informs the display 102 and the DSC 103 about beacons containing messages of the power-saving mode shift at next beacon transmission timing. Even when currently operating in the power-saving mode, the display 102 and the DSC 103 can receive the beacons (F410), because they are set in the awake state at beacon reception timing. As a result, all of the communication apparatuses present in the second wireless network can recognize that the PC 101 as the access point shifts to the power-saving mode.

In step F411, the PC 101 stands by for receiving power-saving mode cancel notifications from the display 102 and the DSC 103 for a predetermined period after the transmission of the beacons (F410). Normally, a communication apparatus currently operating in the power-saving mode can always notify the access point of a cancel notification of the power-saving mode. In the present exemplary embodiment, the communication apparatus of the second wireless network that has recognized the shift of the PC 101 to the power-saving mode transmits, when intending to cancel the power-saving mode, a power-saving mode cancel notification within the predetermined period. Thus, transmission of power-saving mode cancel notifications from the display 102 and the DSC 103 can be prevented while the PC 101 as the access point has been changed to the doze state inhibiting transmission/reception of any data. When the power-saving mode cancel notification is transmitted within the predetermined period, the PC 101 refrains from shifting to the power-saving mode at least until data communication with a transmission source apparatus of the cancel notification is completed.

In step F412, since no power-saving mode cancel notification has been transmitted within the predetermined period, the PC 101 transmits a power-saving mode shift notification to the access point 104. When a response to the notification is returned from the access point 104 in step F413, the PC 101 shifts to the power-saving mode and changes to the doze state. Even after the shift to the power-saving mode, the PC 110 changes from the doze state to the awake state at beacon reception timing from the access point 104 and beacon transmission timing itself. Thus, the PC 101 determines that it can shift itself to the power-saving mode when confirming that all of the communication apparatuses present in the second wireless network managed by itself operate in the power-saving mode, and notifies the access point 104 of the shift to the power-saving mode. The access point 104 can recognize that the PC 101 has shifted to the power-saving mode by receiving the notification. Thus, the access point 104 controls data transmission to the PC 101 by a well-known method thereafter. More specifically, when receiving data to be transmitted to the PC 101, the access point 104 refrains from transfer of the data, causes the PC 101 to return to the normal power mode at predetermined timing, and then transfers the data to the PC 101.

In step F415, it is presumed that a request is made for transmitting image data from the DSC 103 to the display 102 to display the image data. In step F418, to shift to the normal power mode for data transmission, the DSC 103 transmits a power-saving mode cancel notification to the PC 101 within a predetermined period (F417) after reception of a beacon from the PC 101 (F416). When a response to the notification is returned in step F419, then in step F420, the DSC 103 transmits data addressed to the display 102 to the PC 101.

To shift again to the power-saving mode after completion of the data transmission, in step F421, the DSC 103 transmits a power-saving mode shift notification to the PC 101. When a response to the notification is returned in step F422, the DSC 103 shifts again to the power-saving mode and changes to the doze state. The PC 101 recognizes, by receiving the power-saving mode shift notification again from the DSC 103 (F421), that all of the communication apparatuses in the second wireless network are operating in the power-saving mode, and then changes to the doze state.

In step F424, the PC 101 transmits a beacon containing information indicating the retaining of the transmission data addressed to the display 102 at next beacon transmission timing. The display 102 recognizes that there is transmission data addressed to itself by receiving the beacon, and returns to the normal power mode to receive the data. In step F426, the DSC 103 transmits a power-saving mode cancel notification to the PC 101 within a predetermined period (F425) after the reception of the beacon (F424). In step F427, the PC 101 transmits a response to the cancel notification. In step F428, the PC 101 transfers the data transmitted from the DSC 103. In step F429, the display 102 displays the data received from the PC 101 on the display.

It is presumed that the display 102 maintains the normal power mode without shifting to the power-saving mode even after the reception of the data from the PC 101. In this case, the PC 101 maintains the awake state without changing to the doze state.

In step F430, since the display 102 is operating in the normal power mode, for the PC 101 to return to the normal power mode itself, the PC 101 informs the display 102 and the DSC 103 about beacons containing power mode cancel messages at a next beacon transmission timing. The DSC 103 can transmit a power-saving mode cancel notification any time after the reception of the beacon.

In step F431, after the transmission of the beacon (F430), the PC 101 transmits a power-saving mode cancel notification to the access point 104. In step F432, the PC 101 receives a response to the notification from the access point 104. In this way, the PC 101 performs normal data transmission in the first wireless network.

Figure 5B:
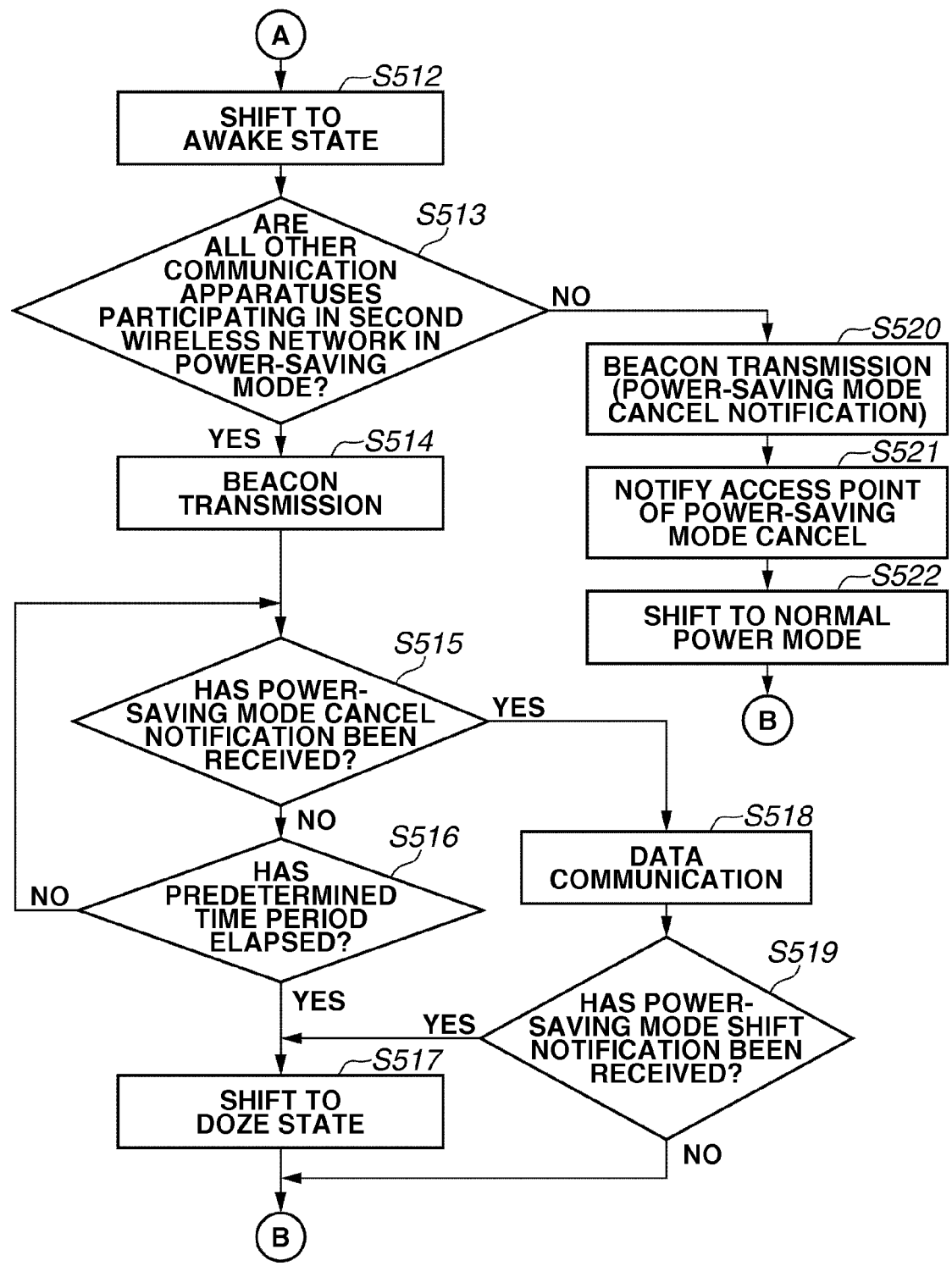

FIGS. 5A and 5B are flowcharts illustrating operations during beacon transmission of the PC 101. An operation during beacon reception from the access point 104 is similar to that at a normal station, and thus description is omitted.

When beacon transmission timing in the second wireless network is reached (YES in step S501), the PC 101 confirms whether the PC 101 itself is operating in the power-saving mode. When the PC 101 is operating in the power-saving mode (YES in step S502), the processing proceeds to step S512.

When the PC 101 is not operating in the power-saving mode, in other words, when the PC 101 is operating in the normal power mode (NO in step S502), then in step S503, the PC 101 determines whether all of the other communication apparatuses (display 102 and DSC 103) participating in the second wireless network are operating in the power-saving mode. When any one of the other communication apparatuses is operating in the normal power mode (NO in sep S503), the processing proceeds to step S511, in which the PC 101 transmits a beacon as usual. Returning to step S501, the PC 101 operates as usual until next beacon transmission timing is reached.

On the other hand, when all of the other communication apparatuses participating in the second wireless network are operating in the power-saving mode (YES in step S503), then in step S504, the PC 101 transmits a beacon containing information indicating a shift to the power-saving mode. In steps S505 and S506, the PC 101 stands by for receiving power-saving mode cancel notifications from the other communication apparatuses for a predetermined period after the beacon transmission.

When the predetermined period elapses without reception of any power-saving mode cancel notification (NO in step S505, and YES in step S506), then in step S509, the PC 101 notifies the access point 104 of a shift to the power-saving mode. In step S510, when a response to the notification is returned from the access point 104, the PC 101 shifts to the power-saving mode and changes to the doze state. Returning to step S501, the PC 101 maintains the doze state until next beacon transmission timing is reached. After the shift to the power-saving mode, when beacon reception timing from the access point 104 is reached, the PC 101 shits to the awake state and receives a beacon from the access point 104.

On the other hand, when the power-saving mode cancel notification is received (YES in step S505), then in step S507, the PC 101 performs data communication with the notification transmission source apparatus. In step S508, after completion of the data communication, the PC 101 confirms whether the power-saving mode shift notification is received again from the communication partner. When the power-saving mode shift notification is received (YES in step S508), then in steps S509 and S510, the PC 101 also shifts to the power-saving mode since all of the other communication apparatuses participating in the second wireless network are operating in the power-saving mode. When no power-saving mode shift notification is received (NO in step S508), the processing returns to step S501. In this case, the PC 101 maintains the normal power mode at least until next beacon transmission timing is reached.

When the PC 101 is operating in the power-saving mode (YES in step S502), then in step S512, the PC 101 changes to the awake state. In step S513, the PC 101 confirms whether all of the other communication apparatuses participating in the second wireless network are operating in the power-saving mode.

When all of the other communication apparatuses participating in the second wireless network are operating in the power-saving mode (YES in step S513), then in step S514, the PC 101 transmits a beacon. The beacon transmitted in this step can contain information indicating retaining of transmission data addressed to the other communication apparatuses operating in the power-saving mode. The beacon can contain information indicating that the PC 101 is operating in the power-saving mode.

In steps S515 and S516, the PC 101 stands by for receiving power-saving mode cancel notifications from the other communication apparatuses for a predetermined period after the beacon transmission. When the predetermined period elapses without reception of any power-saving mode cancel notification (NO in step S515, and YES in step S516), then in step S517, the PC 101 changes again to the doze state, and the processing then returns to step S501.

When the power-saving mode cancel notification is received (YES in step S515), then in step S518, the PC 101 performs data communication with the notification transmission source apparatus. In step S519, after completion of the data communication, the PC 101 confirms whether a power-saving mode shift notification is received again from the communication partner. When the power-saving mode shift notification is received (YES in step S519), then in step S517, the PC 101 also changes again to the doze state since all of the other communication apparatuses in the second wireless network are operating in the power-saving mode.

When no power-saving mode shift notification is received (NO in step S519), the PC 101 continuously operates in the awake state until next beacon transmission timing arrives (S501). In this case, the processing proceeds in the sequence of steps S501, S502, and S512 until next beacon transmission timing. However, at this time, the PC 101 has been set in the awake state, and thus processing of step S512 is omitted.

When any of the communication apparatuses is operating in the normal power mode (YES in step S513), then in step S520, the PC 101 transmits a beacon containing information indicating cancellation of the power-saving mode. In step S521, the PC 101 notifies the access point 104 of the cancellation of the power-saving mode. In step S522, the PC 101 shifts to the normal power mode. After the shift to the normal power mode, the PC 101 performs normal data communication both in the first and second wireless networks.

Thus, according to the present exemplary embodiment, the PC 101 notifies the access point 104 of its own power mode shift according to the power modes of the other communication apparatuses participating in the second wireless network. Specifically, when all of the other communication apparatuses in the second wireless network are operating in the power-saving mode, the PC 101 notifies the access point 104 of its own shifting to the power-saving mode. After transmission of the power-saving mode shift notification, no data is transmitted from the first wireless network irrespective of whether the PC 101 is in the awake state. Thus, the PC 101 can control its own power by taking only a state of the first wireless network into consideration.

When the PC 101 is operating in the power-saving mode, if any one of the other communication apparatuses in the second wireless network is operating in the normal-power mode, the PC 101 notifies the access point 104 of its own shift to the normal power mode. Thus, when a need arises to return to the normal power mode for communication with an apparatus in the second wireless network, the PC 101 is immediately enabled to perform communication in the first wireless network.

The PC 101 notifies the other communication apparatuses in the second wireless network of its own shift to the power-saving mode or the normal power mode by a beacon. As a result, all of the communication apparatuses in the second wireless network can simultaneously recognize a shift of the PC 101 as the access point to the power-saving mode to switch to an operation based on the power state of the PC 101.

Thus, according to the present exemplary embodiment, the PC 101 can reduce power consumption while suppressing failures of data communication in the first and second wireless networks.

A system configuration and a hardware configuration of a PC 101 according to a second exemplary embodiment are similar to those of the first exemplary embodiment illustrated in FIGS. 1 and 2. The present exemplary embodiment is directed to a case where an apparatus (hereinafter, legacy apparatus) unable to recognize a power mode shift of the PC is present in a second wireless network. For example, a case where the DSC 103 illustrated in FIG. 1 is a legacy apparatus will be considered. As described above in the first exemplary embodiment, when receiving a power-saving mode shift notification from the PC 101, the display 102, which is a nonlegacy apparatus, can notify cancellation of the power-saving mode only within a predetermined period from beacon reception timing. When the DSC 103 as the legacy apparatus is present in the second wireless network, if the PC 101 shifts to the power-saving mode, data may be transmitted from the DSC 103 to the PC 101 while the PC 101 is in the doze state. In the present exemplary embodiment, a processing example for reducing an occurring probability of such a state will be described.

Figure 7:
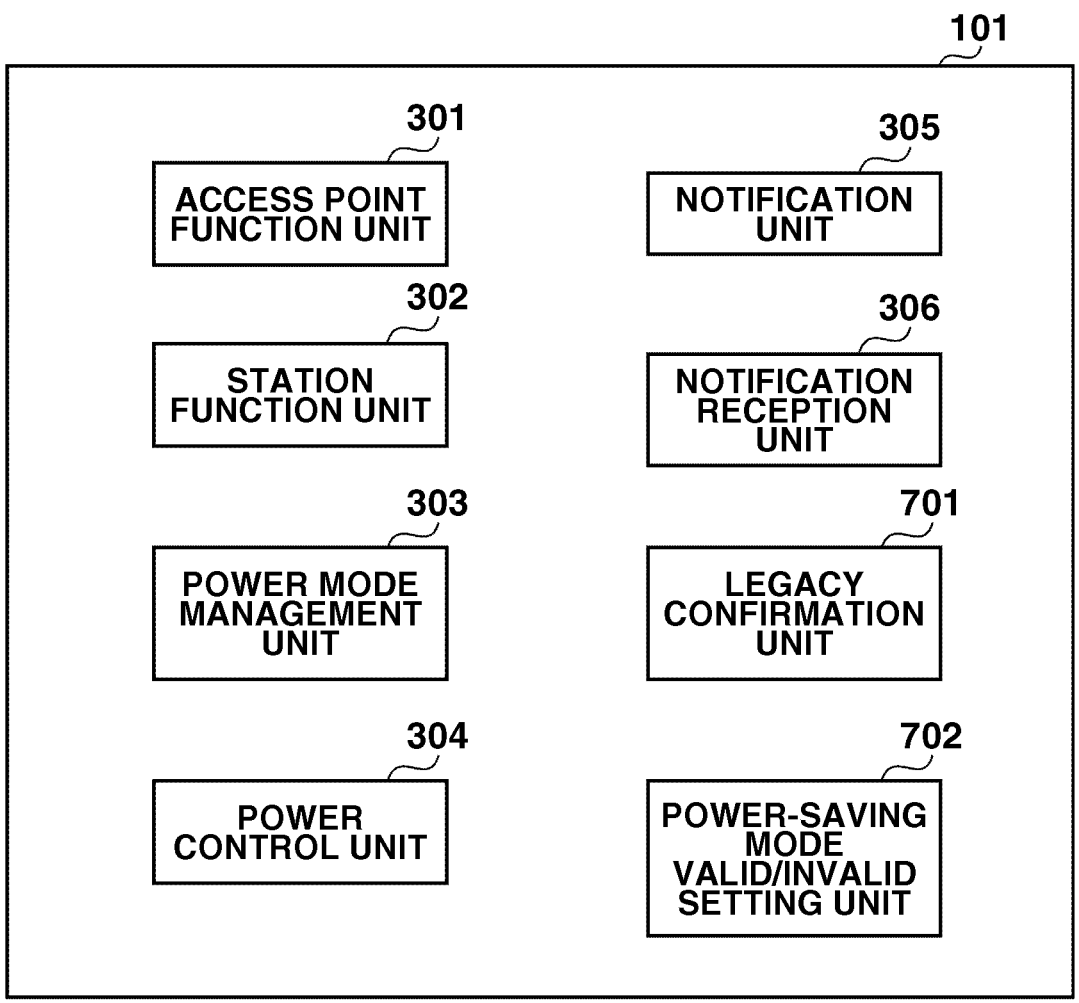
FIG. 7 is a block diagram illustrating a software function of the PC according to the second exemplary embodiment.

FIG. 7 is a block diagram illustrating a software function of the PC 101 according to the present exemplary embodiment. In addition to the functional blocks of the first exemplary embodiment illustrated in FIG. 3, the PC 101 further includes blocks 701 and 702. A legacy confirmation unit 701 confirms whether an apparatus that has newly transmitted a connection request (participation request) to the second wireless network is a legacy apparatus. More specifically, the legacy confirmation unit 701 confirms whether the participation request source apparatus to the second wireless network can recognize a power mode shift of the PC 101. A power-saving mode valid/invalid setting unit 702 sets valid or invalid the shift of the PC 101 to the power-saving mode.

Figure 6:
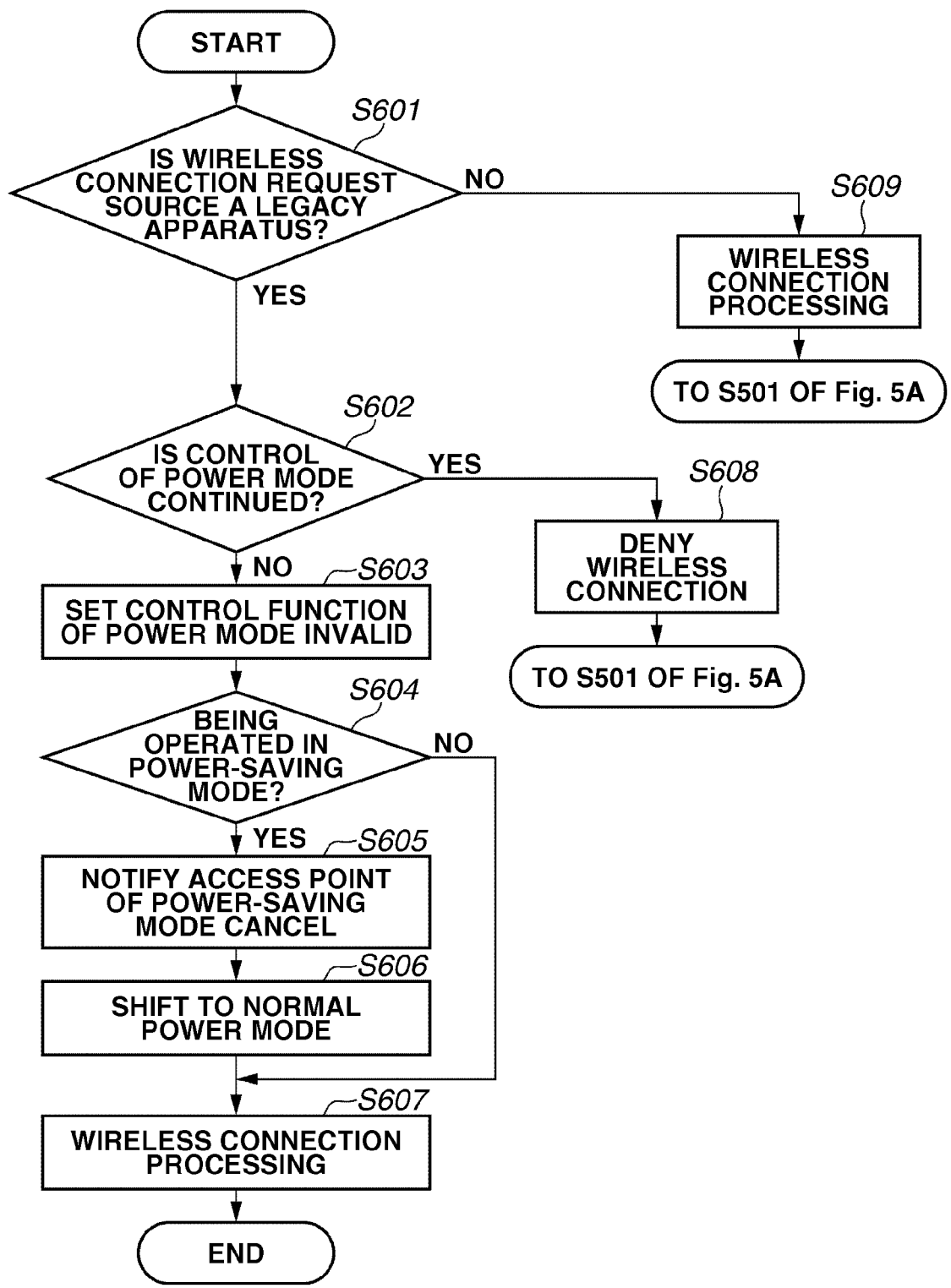
FIG. 6 is a flowchart illustrating an operation during wireless connection request reception of a PC according to a second exemplary embodiment.

FIG. 6 is a flowchart illustrating an operation when the PC 101 receives a request of wireless connection to the second wireless network.

In step S601, when receiving a wireless connection request to the second wireless network, the PC 101 confirms whether a request source is a legacy apparatus. For example, when transmitting a request of connection to the second wireless network, a nonlegacy apparatus transmits the request containing information indicating that it is a nonlegacy apparatus to the PC 101. Thus, the PC 101 can determine that a transmission source of a connection request not containing the information is a legacy apparatus. Communication parameters may be automatically set with the PC 101 beforehand to connect to the second wireless network by wireless. During the automatic setting, the information can be notified to the PC 101. For example, Wi-Fi Protected Setup (hereinafter, WPS), which is an industry standard for automatic communication parameter setting, is used, it is useful to notify the PC 101 of a nonlegacy apparatus in the process of a WPS protocol. When receiving a wireless connection request after the WPS processing, the PC 101 can determine whether a source of the wireless connection request is a legacy apparatus according to whether the notification has been received from the wireless connection request source during the WPS processing.

When the wireless connection request source is not a legacy apparatus (NO in step S601), then in step S609, the PC 101 performs wireless connection to the request source. Then, the processing proceeds to step S501 in the first exemplary embodiment illustrated in FIG. 5A.

When the wireless connection request source is a legacy apparatus (YES in step S601), then in step S602, the PC 101 determines whether to continue control of its power mode. As a determination method, for example, the control of the power mode is determined not to be continued if a power supplying method of the PC 101 is commercial power (alternating-current (AC) power) supplying. The control of the power mode is determined to be continued in the case of battery power supplying. Whether to continue the control of the power mode can be determined according to a remaining battery level. Whether to continue the control of the power mode when the legacy apparatus makes a wireless connection request can be set beforehand, or the user may be allowed to set such a state.

When the control of the power mode is determined not to be continued (NO in step S602), then in step S603, the PC 101 sets invalid a control function of its own power mode. When operating in the power-saving mode (YES in step S604), then in step S605, the PC 101 notifies the access point 104 of cancellation of the power-saving mode. In step S606, the PC 101 shifts to the normal power mode. Thus, an apparatus currently operating in the second wireless network can return from the power-saving mode to the normal power mode any time. In step S607, after completion of the processing of steps S603 to S606, the PC 101 performs wireless connection to the legacy apparatus that has made the wireless connection request. Though not illustrated, the PC 101 broadcasts a beacon containing cancellation of the power-saving mode on the second wireless network at next beacon transmission timing. As a result, the apparatus currently operating in the second wireless network can return from the power-saving mode to the normal power mode any time. At the time of subsequent beacon transmission, the PC 101 does not perform the processing illustrated in FIGS. 5A and 5B, but performs an operation similar to that of a normal access point.

On the other hand, when the control of the power mode is continued (YES in step S602), then in step S608, the PC 101 denies wireless connection with the legacy apparatus that has made the wireless connection request. Then, the processing proceeds to step S501 in FIG. 5A.

Thus, according to the present exemplary embodiment, when wireless connection is requested from the legacy apparatus, switching can be performed between cancellation of the power-saving mode of the PC 101 to invalidate the control function of the power mode and denying of the wireless connection with the legacy apparatus. When the power-saving mode is canceled to invalidate the control function of the power mode, while power consumption of the PC 101 cannot be suppressed, data transmission from the DSC 103 can be prevented during the doze state. Thus, for example, when the PC 101 is commercial power (AC-powered) or there is a free battery capacity, it is advisable to invalidate the control function of the power mode.

When the wireless connection with the legacy apparatus is denied, while data communication with the legacy apparatus is inhibited, power consumption of the PC 101 can be reduced. Thus, when the PC 101 is battery-powered or there is a free battery capacity, denying the wireless connection with the legacy apparatus enables suppression of power consumption while connection with a nonlegacy apparatus and an access point is continued.

If the control function of the power mode is set invalid (YES in step S603), when the legacy apparatus subsequently leaves from the second wireless network, the control function of the power mode can be set valid. As a result, after the legacy apparatus has left from the second wireless network, the PC 101 can shift again to the power-saving mode.

In the above description, switching is performed between the processing of steps S603 to S607 and the processing of step S608 according to the determination result in step S602. However, without executing the processing of step S602, one of steps S603 to S607 and step S608 can be performed.

The order of steps S603 to S607 is not limited to the above. For example, the processing in steps S603 to S606 can be performed after wireless connection with the legacy apparatus.

As described above, according to each of the above-described exemplary embodiments, in a communication apparatus that participates as a terminal station in a first wireless network formed by another base station and forms a second wireless network as a base station, power can be saved while data communication failures are reduced.

Each of the exemplary embodiments has been described by way of example of the wireless LAN compliant with the IEEE 802.11 standard. However, the embodiments can be implemented in other wireless media such as a wireless universal serial bus (USB), Bluetooth (registered trademark), and an ultra-wideband (UWB).

The embodiments can be applied to a recording medium for recording program code of software to realize the aforementioned functions. The recording medium is supplied to a system or an apparatus, and a computer (central processing unit (CPU) or microprocessing unit (MPU)) of the system or the apparatus reads and executes the program code stored in the storage medium. In an example, a computer-readable medium or a computer-readable storage medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278005, filed Dec. 7, 2009 which is hereby incorporated by reference herein in its entirety.

What is claimed is:

1. A communication apparatus, comprising:
at least one processor and memory storing instructions that, when executed by the processor, cause the communication apparatus to:
participate in a first network formed by a first base station as a station;
form a second network as a base station;
manage a power mode of another communication apparatus participating in the second network;
determine whether the another communication apparatus has shifted from operating according to a first power mode to operating according to a second power mode, wherein power consumption of the second power mode is less than power consumption of the first power mode;
notify the first base station of a change of a power mode of the communication apparatus from the first power mode to the second power mode in a case where it is determined that the another communication apparatus has shifted to operation according to the second power mode; and
change the power mode of the communication apparatus from the first power mode to the second power mode according to a response, from the first base station, to the notification in a case where the communication apparatus participates in the first network and forms the second network.

2. The communication apparatus according to claim 1, wherein the communication apparatus notifies, when all other communication apparatuses participating in the second network are operating in the second power mode, the first base station of a change of the communication apparatus to the second power mode.

3. The communication apparatus according to claim 1, wherein the communication apparatus notifies, when the communication apparatus is operating in the second power mode, if any one of other communication apparatuses participating in the second network is operating in the first power mode, the first base station of a change of the communication apparatus to the first power mode.

4. The communication apparatus according to claim 1, wherein the instructions further cause the communication apparatus to periodically transmit an informing signal, wherein the change of the power mode of the communication apparatus is notified to the another communication apparatus participating in the second network via the informing signal.

5. The communication apparatus according to claim 1, wherein the instructions further cause the communication apparatus to:
confirm whether another communication apparatus that requests participation in the second network is capable of recognizing the change of the power mode of the communication apparatus; and
set invalid a change of the communication apparatus to the second power mode according to a result of confirming and a result of determining whether to continue control of the power mode.

6. The communication apparatus according to claim 5, wherein when the communication apparatus is operating in the second power mode, the communication apparatus shifts from the second power mode to the first power mode according to the result of determining whether to continue control of the power mode.

7. The communication apparatus according to claim 1, wherein the instructions further cause the communication apparatus to confirm whether another communication apparatus that requests participation in the second network is capable of recognizing the change of the power mode of the communication apparatus,
wherein the communication apparatus denies connection with the another communication apparatus that requests participation in the second network according to a result of confirming and according to a result of determining whether to continue control of the power mode.

8. The communication apparatus according to claim 1, wherein when the communication apparatus operates in the second power mode, the communication apparatus repeatedly switches between an awake state and a doze state, and
wherein the communication apparatus operates in the awake state at timing of receiving an informing signal from the first base station and timing of transmitting an informing signal.

9. The communication apparatus according to claim 8, wherein to receive a power mode change notification from the another communication apparatus participating in the second network, the communication apparatus operates in the awake state during a predetermined period from transmission of the informing signal to transmission of a next informing signal.

10. A method for controlling a communication apparatus, the method comprising:
participating in a first network formed by a first base station as a station;
forming a second network with another communication apparatus as a base station;
determining whether the another communication apparatus has shifted from operating according to a first power mode to operating according to a second power mode, wherein power consumption of the second power mode is less than power consumption of the first power mode;
notifying the first base station of a change of a power mode of the communication apparatus from the first power mode to the second power mode in a case where it is determined that the another communication apparatus has shifted to the second power mode; and
changing the power mode of the communication apparatus from the first power mode to the second power mode according to a response, from the first base station, to the notification in a case where the communication apparatus participates in the first network and forms the second network.

11. A non-transitory computer-readable storage medium storing a program for causing a computer to execute a method for controlling a communication apparatus, the method comprising:

participating in a first network formed by a first base station as a station;

forming a second network with another communication apparatus as a base station;

determining whether the another communication apparatus has shifted from operating according to a first power mode to operating according to a second power mode, wherein power consumption of the second power mode is less than power consumption of the first power mode;

notifying the first base station of a change of a power mode of the communication apparatus from the first power mode to the second power mode in a case where it is determined that the another communication apparatus has shifted to the second power mode; and changing the power mode of the communication apparatus from the first power mode to the second power mode according to a response, from the first base station, to the notification in a case where the communication apparatus participates in the first network and forms the second network.

* * * * *